(12) United States Patent
Wu et al.

(10) Patent No.: US 12,362,854 B2
(45) Date of Patent: Jul. 15, 2025

(54) CONFIGURATION FOR PROBABILISTIC AMPLITUDE SHAPING SYSTEM ON SPATIAL AND FREQUENCY SELECTIVE WIRELESS CHANNEL

(71) Applicant: QUALCOMM Incorporated, San Diego, CA (US)

(72) Inventors: Liangming Wu, Beijing (CN); Wei Liu, Beijing (CN); Kexin Xiao, Shanghai (CN); Changlong Xu, Beijing (CN); Ori Shental, Marlboro, NJ (US); Thomas Joseph Richardson, South Orange, NJ (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 18/563,020

(22) PCT Filed: Jul. 7, 2021

(86) PCT No.: PCT/CN2021/104891
§ 371 (c)(1),
(2) Date: Nov. 21, 2023

(87) PCT Pub. No.: WO2023/279271
PCT Pub. Date: Jan. 12, 2023

(65) Prior Publication Data
US 2024/0243840 A1  Jul. 18, 2024

(51) Int. Cl.
*H04L 1/00* (2006.01)

(52) U.S. Cl.
CPC .......... *H04L 1/0042* (2013.01); *H04L 1/0003* (2013.01)

(58) Field of Classification Search
CPC ... H04L 1/0042; H04L 1/0003; H04L 1/0009; H04L 1/0015
(Continued)

(56) References Cited

U.S. PATENT DOCUMENTS

| 10,700,807 | B1 | 6/2020 | Vassilieva et al. |
| 2010/0103920 | A1 | 4/2010 | Damnjanovic et al. |

(Continued)

FOREIGN PATENT DOCUMENTS

| WO | 2020156672 A1 | 8/2020 |

OTHER PUBLICATIONS

Fehenberger T., et al., "Huffman-Coded Sphere Shaping and Distribution Matching Algorithms via Lookup Tables", Journal of Lightwave Technology May 15, 2020(May 15, 2020) No. 10 vol. 38 the whole document, pp. 2826-2834.

(Continued)

*Primary Examiner* — Fitwi Y Hailegiorgis
(74) *Attorney, Agent, or Firm* — Paul M. McAdams; Harrity & Harrity, LLP

(57) ABSTRACT

In a probabilistic amplitude shaping (PAS) system, a distribution matching (DM) component may receive a uniform bit sequence with equal probabilities, which may be converted into symbols with a desired probability distribution (e.g., Gaussian). For example, the probability distribution may use inner constellation points associated with a lower energy and/or power more frequently and outer constellation points associated with a higher energy and/or power less frequently. In general, the DM component may map binary bits to positive amplitudes with a non-uniform distribution according to a DM rate that is based at least in part on a signal-to-noise ratio (SNR), which may vary significantly in a spatial and frequency selective wireless channel. Accordingly, some aspects described herein relate to configuring (Continued)

DM parameters and codeword and resource mappings in a spatial and frequency selective wireless channel.

30 Claims, 12 Drawing Sheets

(58) Field of Classification Search
USPC .......................................................... 375/295
See application file for complete search history.

(56) References Cited

U.S. PATENT DOCUMENTS

| | | | |
|---|---|---|---|
| 2011/0216723 A1 | 9/2011 | Sartori et al. | |
| 2012/0250558 A1* | 10/2012 | Chung | H04L 5/0098 370/252 |
| 2022/0007224 A1* | 1/2022 | Venugopal | H04B 7/0626 |

OTHER PUBLICATIONS

International Search Report and Written Opinion—PCT/CN2021/104891—ISA/EPO—Feb. 28, 2022.
Yoshida T., et al., "Hierarchical Distribution Matching for Probabilistically Shaped Coded Modulation", Journal of Lightwave Technology, Mar. 15, 2019 (Mar. 15, 2019) No. 6 vol. 37 the whole document, arXiv: 1809.01653v2 [eess.SP] Dec. 26, 2018, pp. 1-11.
ZTE: "Discussion on DL 1024QAM for NR FR1", 3GPP TSG RAN WG1 #103-e, R1-2007977, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020, XP051946553, Nov. 13, 2020, 16 Pages, Retrieved on Oct. 24, 2020, Section 3, Part 3, Section 3, pp. 7 and 8, Figure 5.
Supplementary European Search Report—EP21948769—Search Authority—Munich—Feb. 5, 2025.

* cited by examiner

532
WB configuration includes modulation order and coding rate; SB configurations include DM parameter(s) per sub-band

| WB(m, c) | (2, 0.6) | (3, 0.7) | (4, 0.8) | (5, 0.9) |
|---|---|---|---|---|
| $SB_1(v)$ | 0.01 | 0.007 | 0.005 | 0.001 |
| $SB_2(v)$ | 0.02 | 0.008 | 0.006 | 0.002 |
| $SB_3(v)$ | 0.03 | 0.009 | 0.007 | 0.003 |
| $SB_4(v)$ | 0.04 | 0.01 | 0.008 | 0.004 |

534
WB configuration includes modulation order; SB configurations include DM parameter(s) and coding rate per sub-band

| WB(m) | 2 | 3 | 4 | 5 |
|---|---|---|---|---|
| $SB_1(c, v)$ | (0.6, 0.01) | (0.7, 0.007) | (0.5, 0.005) | (0.6, 0.001) |
| $SB_2(c, v)$ | (0.7, 0.02) | (0.8, 0.008) | (0.6, 0.006) | (0.7, 0.002) |
| $SB_3(c, v)$ | (0.7, 0.03) | (0.8, 0.009) | (0.7, 0.006) | (0.8, 0.003) |
| $SB_4(c, v)$ | (0.8, 0.04) | (0.9, 0.01) | (0.8, 0.006) | (0.8, 0.004) |

536
Common WB parameters and layer-specific SB parameters

| FD index | WB | $SB_{L1}$ | $SB_{L2}$ |
|---|---|---|---|
| 0 | m=4<br>c=0.8 | 0.5 | 0.7 |
| 1 | | 0.5 | 0.6 |
| 2 | | 0.6 | 0.6 |
| 3 | | 0.7 | 0.5 |

538
Layer-specific WB and SB parameters

| FD index | $WB_{L1}$ | $SB_{L1}$ | $WB_{L2}$ | $SB_{L2}$ |
|---|---|---|---|---|
| 0 | m=4<br>c=0.8 | 0.005 | m=3<br>c=0.7 | 0.007 |
| 1 | | 0.005 | | 0.008 |
| 2 | | 0.006 | | 0.008 |
| 3 | | 0.007 | | 0.007 |

FIG. 5B

| Layer index | Sub-band index | Mod order, code rate | DM parameter | DM block index | Codeword index |
|---|---|---|---|---|---|
| 1 | 1 | m = 3<br>c = 0.7 | 0.007 | 1 | 1 |
| 1 | 2 | m = 3<br>c = 0.7 | 0.008 | 2 | 1 |
| 1 | 3 | m = 3<br>c = 0.7 | 0.008 | 2 | 1 |
| 1 | 4 | m = 3<br>c = 0.7 | 0.009 | 3 | 1 |
| 2 | 1 | m = 3<br>c = 0.8 | 0.010 | 4 | 2 |
| 2 | 2 | m = 3<br>c = 0.8 | 0.009 | 3 | 2 |
| 2 | 3 | m = 3<br>c = 0.8 | 0.008 | 2 | 2 |
| 2 | 4 | m = 3<br>c = 0.8 | 0.008 | 2 | 2 |

548
Concatenate DM blocks that share the same modulation order and DM parameter(s)

FIG. 5E

CONFIGURATION FOR PROBABILISTIC AMPLITUDE SHAPING SYSTEM ON SPATIAL AND FREQUENCY SELECTIVE WIRELESS CHANNEL

CROSS-REFERENCE TO RELATED APPLICATION

This application is a 371 national stage of Patent Cooperation Treaty (PCT) Application No. PCT/CN2021/104891 filed on Jul. 7, 2021, entitled "CONFIGURATION FOR PROBABILISTIC AMPLITUDE SHAPING SYSTEM ON SPATIAL AND FREQUENCY SELECTIVE WIRELESS CHANNEL," which is hereby expressly incorporated by reference herein.

FIELD OF THE DISCLOSURE

Aspects of the present disclosure generally relate to wireless communication and to techniques and apparatuses for configuring a probabilistic amplitude shaping (PAS) system on a spatial and frequency selective wireless channel.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. 5G, which may be referred to as New Radio (NR), is a set of enhancements to the LTE mobile standard promulgated by the 3GPP. 5G is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in 4G, 5G, and other radio access technologies remain useful.

SUMMARY

Probabilistic amplitude shaping (PAS), sometimes referred to as probabilistic constellation shaping (PCS), is a coded modulation technique in which constellation shaping is combined with channel coding. For example, in existing wireless networks, coherent transmission is typically based on quadrature amplitude modulation (QAM), where data bits are encoded into a constellation in which each point is a unique combination of phase and amplitude. In QAM and other traditional modulation techniques, each constellation point has the same probability of being used, whereby outer constellation points that have a higher amplitude and consume more energy and/or power have the same probability of being used as inner constellation points that have a lower amplitude and consume less energy and/or power. In a system that uses PAS and/or PCS, referred to herein as a PAS system, lower energy/power constellations may be used more frequently, enabling benefits such as enhanced granularity and improved noise tolerance. For example, in a PAS system, a distribution matching (DM) component may receive a uniform bit sequence with equal probabilities, and the DM component may convert the uniform bit sequence into symbols with a desired probability distribution (e.g., Gaussian). Accordingly, by using inner constellation points associated with a lower energy and/or a lower power more frequently than outer constellation points associated with a higher energy and/or a higher power, a PAS system may enable granular control over a number of bits per symbol and improved spectral efficiency with better noise tolerance and/or fewer nonlinearities relative to traditional QAM, among other examples.

However, one challenge that may arise in a PAS system is sensitivity to signal-to-noise ratio (SNR) variation, which can be significant in a spatial and frequency selective wireless channel. For example, in a PAS system, a DM rate that is used to map binary bits to positive amplitudes with a non-uniform distribution needs to be properly adapted based on different SNR conditions, which may be difficult in wireless environments with significant SNR variation (e.g., a spatial and frequency selective channel). For example, a wireless channel may experience fading (e.g., varied signal attenuation) in a spatial domain, a frequency domain, and/or a time domain due to multipath propagation, weather, and/or shadowing from obstacles that affect wave propagation, among other examples. Accordingly, to combat fading, a wireless network may support techniques such as frequency-selective precoding, channel coding, and/or interleaving, which can result in SNR variation in the spatial domain, the frequency domain, and/or the time domain. Some aspects described herein relate to techniques and apparatuses to configure a PAS system (e.g., indicate a DM rate) in a spatial and/or frequency selective wireless channel that may be associated with SNR variations.

For example, in some aspects, a modulation and coding scheme (MCS) configuration may include a wideband configuration and a sub-band configuration, where the wideband configuration may include a modulation order to apply to a wideband frequency and the sub-band configuration may include a differential or selective indication of one or more DM parameters for different sub-bands within the wideband frequency. In some aspects, the wideband configuration may further include a coding rate to apply to the wideband frequency, or the coding rate may be provided in a differential or selective indication per sub-band. In this way, the wideband parameters (e.g., modulation order) may be applicable over a wide range of SNRs, and the sub-band parameters (e.g., DM parameters) may be fine-tuned based on SNR variations that occur in different sub-bands. Furthermore, some aspects described herein relate to a codeword and resource mapping that may be used in a spatial and/or frequency selective wireless channel. For example, in some aspects, resources that are associated with the same DM parameters may be mapped to the same codeword, or resources that are associated with different DM parameters (e.g., the same modulation order and/or coding rate but different DM parameters) may be mapped to the same codeword.

Some aspects described herein relate to a UE for wireless communication. The user equipment may include a memory and one or more processors coupled to the memory. The one or more processors may be configured to determine an MCS configuration associated with a PAS system, wherein the MCS configuration includes a wideband configuration that indicates a modulation order for a wideband frequency and a sub-band configuration that indicates DM parameters for multiple sub-band frequencies within the wideband frequency. The one or more processors may be configured to map one or more resources in a spatial domain, a frequency domain, or a time domain to one or more codewords based at least in part on the MCS configuration. The one or more processors may be configured to transmit the one or more codewords over a wireless channel.

Some aspects described herein relate to a method of wireless communication performed by a UE. The method may include determining an MCS configuration associated with a PAS system, wherein the MCS configuration includes a wideband configuration that indicates a modulation order for a wideband frequency and a sub-band configuration that indicates DM parameters for multiple sub-band frequencies within the wideband frequency. The method may include mapping one or more resources in a spatial domain, a frequency domain, or a time domain to one or more codewords based at least in part on the MCS configuration. The method may include transmitting the one or more codewords over a wireless channel.

Some aspects described herein relate to an apparatus for wireless communication. The apparatus may include means for determining an MCS configuration associated with a PAS system, wherein the MCS configuration includes a wideband configuration that indicates a modulation order for a wideband frequency and a sub-band configuration that indicates DM parameters for multiple sub-band frequencies within the wideband frequency. The apparatus may include means for mapping one or more resources in a spatial domain, a frequency domain, or a time domain to one or more codewords based at least in part on the MCS configuration. The apparatus may include means for transmitting the one or more codewords over a wireless channel.

Some aspects described herein relate to a non-transitory computer-readable medium that stores a set of instructions for wireless communication by a UE. The set of instructions, when executed by one or more processors of the UE, may cause the UE to determine an MCS configuration associated with a PAS system, wherein the MCS configuration includes a wideband configuration that indicates a modulation order for a wideband frequency and a sub-band configuration that indicates DM parameters for multiple sub-band frequencies within the wideband frequency. The set of instructions, when executed by one or more processors of the UE, may cause the UE to map one or more resources in a spatial domain, a frequency domain, or a time domain to one or more codewords based at least in part on the MCS configuration. The set of instructions, when executed by one or more processors of the UE, may cause the UE to transmit the one or more codewords over a wireless channel.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIGS. 5A-5E are diagrams illustrating examples associated with configuring a PAS system on a spatial and frequency selective wireless channel.

DETAILED DESCRIPTION

Figure 1:
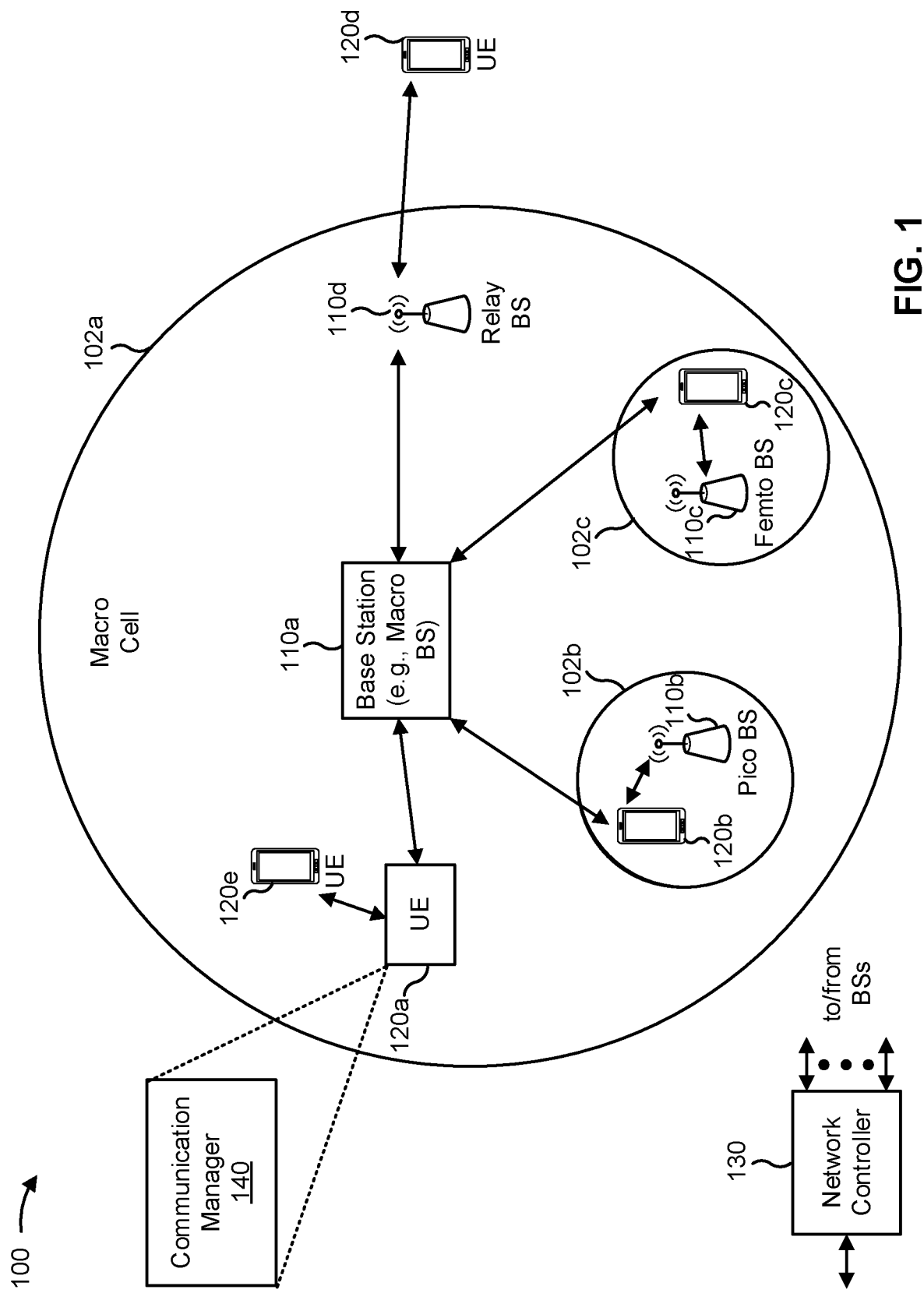
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G, two initial operating bands have been identified as frequency range designations FR1 (410 MHz-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G operation beyond 52.6 GHz. For example, three higher operating bands have been identified as frequency range designations FR4a or FR4-1 (52.6 GHZ-71 GHZ), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine a modulation and coding scheme (MCS) configuration associated with a probabilistic amplitude shaping (PAS) system, wherein the MCS configuration includes a wideband configuration that indicates a modulation order for a wideband frequency and a sub-band configuration that indicates distribution matching (DM) parameters for multiple sub-band frequencies within the wideband frequency; map one or more resources in a spatial domain, a frequency domain, or a time domain to one or more codewords based at least in part on the MCS configuration; and transmit the one or more codewords over a wireless channel. Additionally, or alternatively, the communication manager 140 may perform one or more other operations described herein.

As indicated above, FIG. 1 is provided as an example. Other examples may differ from what is described with regard to FIG. 1.

Figure 2:
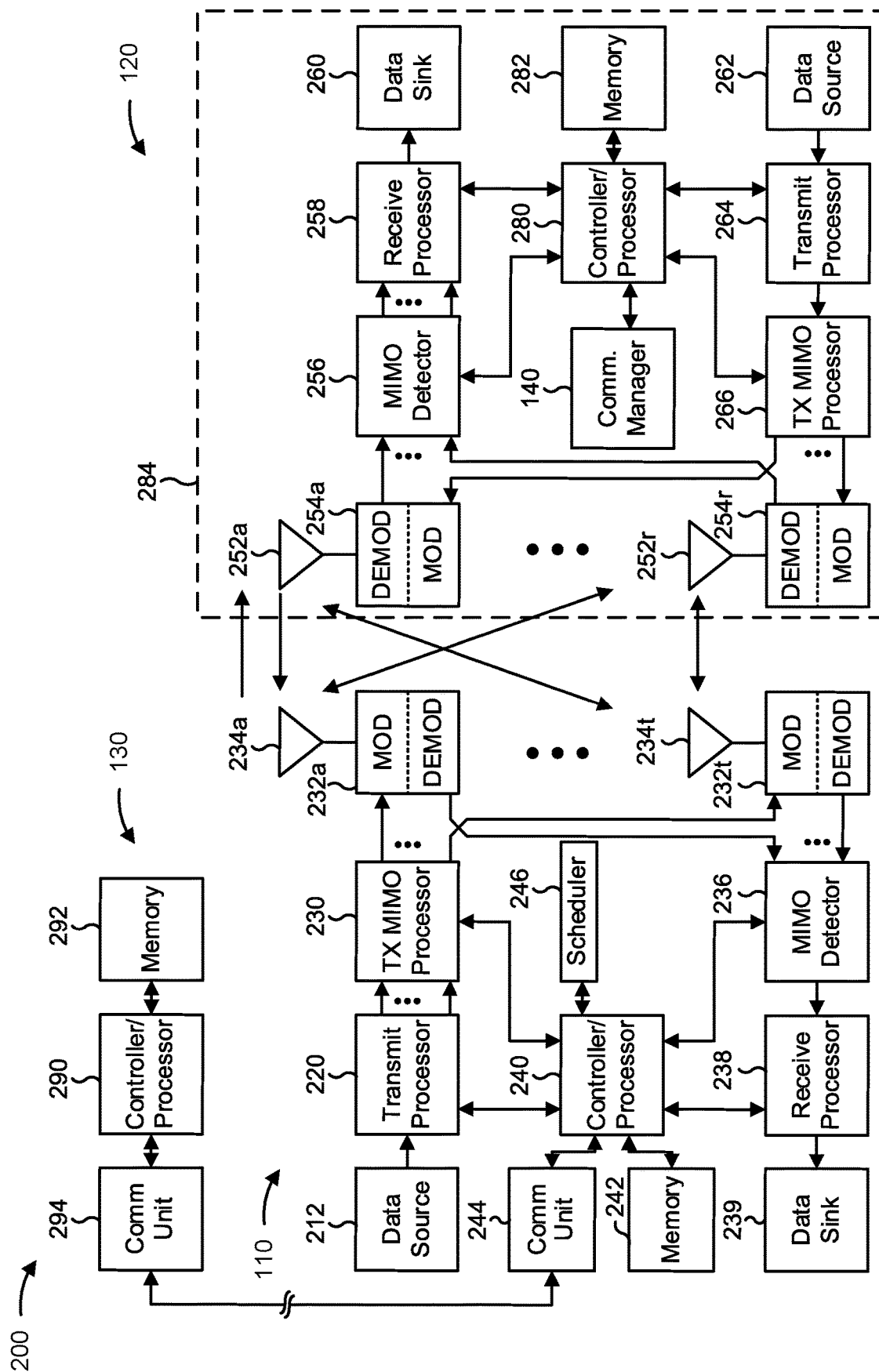
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more MCSs for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with configuring a probabilistic amplitude shaping (PAS) system on a spatial and frequency selective wireless channel, as described in more detail elsewhere herein. For example, the controller/processor 240 of the base station 110, the controller/processor 280 of the UE 120, and/or any other component(s) of FIG. 2 may perform or direct operations of, for example, method 600 of FIG. 6 and/or other methods as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 600 of FIG. 6 and/or other methods as described herein. In some examples, executing instructions may include running the instructions, converting the instructions, compiling the instructions, and/or interpreting the instructions, among other examples.

In some aspects, the UE 120 includes means for determining an MCS configuration associated with a PAS system, wherein the MCS configuration includes a wideband configuration that indicates a modulation order for a wideband frequency and a sub-band configuration that indicates DM parameters for multiple sub-band frequencies within the wideband frequency; means for mapping one or more resources in a spatial domain, a frequency domain, or a time domain to one or more codewords based at least in part on the MCS configuration; and/or means for transmitting the one or more codewords over a wireless channel. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
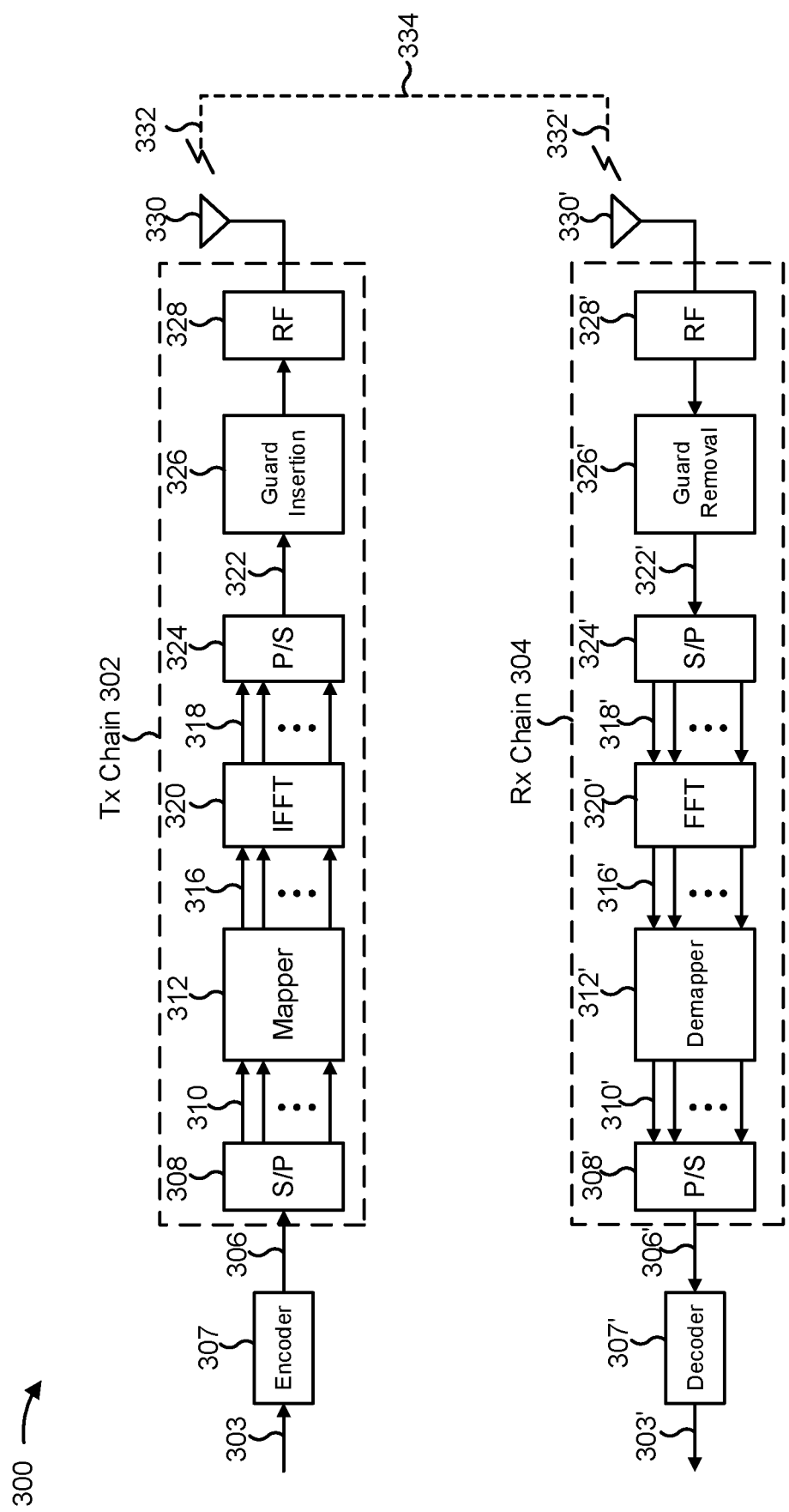
FIG. 3 is a diagram illustrating an example of a transmit (Tx) chain and a receive (Rx) chain of a UE.

FIG. 3 is a diagram illustrating an example 300 of a transmit (Tx) chain 302 and a receive (Rx) chain 304 of a UE 120. In some aspects, one or more components of Tx chain 302 may be implemented in transmit processor 264, TX MIMO processor 266, modem 254, and/or controller/processor 280, as described above in connection with FIG. 2. In some aspects, Tx chain 302 may be implemented in UE 120 for transmitting data 306 (e.g., uplink data, an uplink reference signal, and/or uplink control information transmitted to base station 110 on an uplink channel and/or sidelink data, a sidelink reference signal, and/or sidelink control information transmitted to another UE 120 on a sidelink channel).

As shown in FIG. 3, an encoder 307 may alter a signal (e.g., a bitstream) 303 into data 306. Data 306 to be transmitted is provided from the encoder 307 as input to a serial-to-parallel (S/P) converter 308. In some aspects, the S/P converter 308 may split the transmission data into N parallel data streams 310.

The N parallel data streams 310 may then be provided as input to a mapper 312. The mapper 312 may map the N parallel data streams 310 onto N constellation points. The mapping may be performed using a modulation constellation, such as binary phase-shift keying (BPSK), quadrature phase-shift keying (QPSK), 8 phase-shift keying (8PSK), and/or quadrature amplitude modulation (QAM). Thus, the mapper 312 may output N parallel symbol streams 316, each symbol stream 316 corresponding to one of N orthogonal subcarriers of an inverse fast Fourier transform (IFFT) component 320. The N parallel symbol streams 316 are represented in the frequency domain and may be converted into N parallel time domain sample streams 318 by IFFT component 320.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

In some aspects, the Rx chain 304 may utilize OFDM/OFDMA. In some aspects, one or more components of the Rx chain 304 may be implemented in receive processor 258, MIMO detector 256, modem 254, and/or controller/processor 280, as described above in connection with FIG. 2. In some aspects, the Rx chain 304 may be implemented in a UE 120 for receiving data 306 (e.g., downlink data, a downlink reference signal, and/or downlink control information received from a base station 110 on a downlink channel and/or sidelink data, a sidelink reference signal, and/or sidelink control information received from another UE 120 on a sidelink channel).

A transmitted signal 332 is shown traveling over a wireless channel 334 from the Tx chain 302 to the Rx chain 304. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The output may include an OFDM/OFDMA symbol stream 322', and the S/P converter 324' may divide the OFDM/OFDMA symbol stream 322' into N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, the data stream 306' corresponds to the data 306 that was provided as input to the Tx chain 302. The data stream 306' may be decoded into a decoded data stream 303' by a decoder 307'.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4:
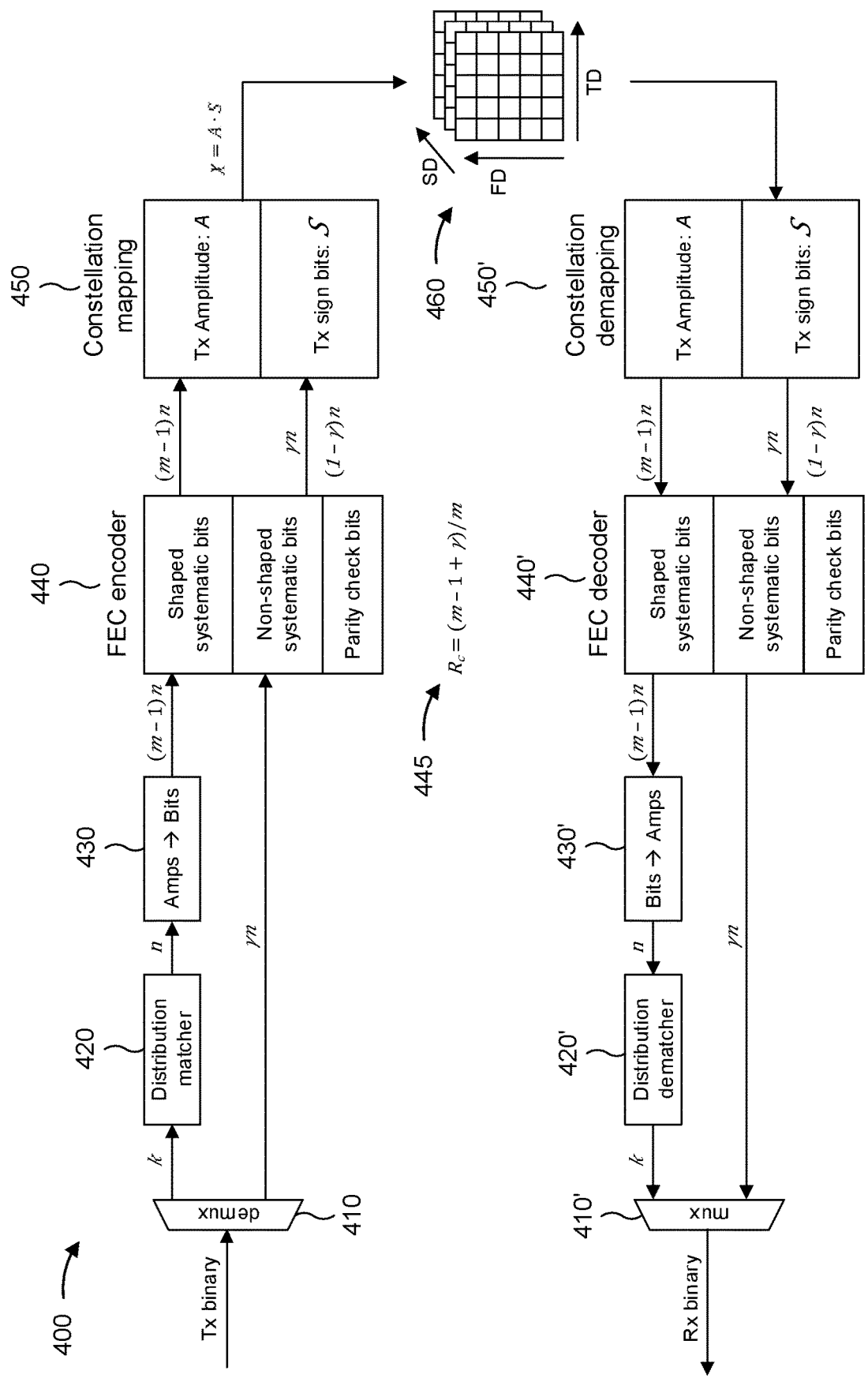
FIG. 4 is a diagram illustrating an example of a Tx chain and an Rx chain per dimension in a probabilistic amplitude shaping (PAS) system.

FIG. 4 is a diagram illustrating an example of a Tx chain and an Rx chain per dimension in a PAS system. In some aspects, one or more components of the Tx chain may be implemented in the transmit processor 264, the TX MIMO processor 266, the modem 254, and/or the controller/processor 280 described above in connection with FIG. 2. In some aspects, the Tx chain may be implemented in a UE 120 for transmitting data to a base station 110 on an uplink channel and/or transmitting data to another UE 120 on a sidelink channel using a PAS technique.

In particular, PAS, sometimes referred to as probabilistic constellation shaping (PCS), is a coded modulation technique in which constellation shaping is combined with channel coding. For example, in existing wireless networks, coherent transmission is typically based on QAM and/or other modulation techniques where data bits to be transmitted are encoded into a constellation in which each point is a unique combination of phase and amplitude. In QAM and other traditional modulation techniques, each constellation point has the same probability of being used, whereby outer constellation points that have a higher amplitude and consume more energy and/or power have the same probability of being used as inner constellation points that have a lower amplitude and consume less energy and/or power. In a system that uses PAS and/or PCS, referred to herein as a PAS system, lower energy/power constellations (e.g., inner points) may be used more frequently, enabling benefits such as enhanced granularity and improved noise tolerance. For example, in a PAS system, a distribution matching (DM) component may receive a uniform bit sequence with equal probabilities, and the DM component may convert the uniform bit sequence into symbols with a desired probability distribution (e.g., Gaussian). Accordingly, by using inner constellation points associated with a lower energy and/or a lower power more frequently than outer constellation points associated with a higher energy and/or a higher power, a PAS system may enable granular control over a number of bits per symbol and improved spectral efficiency with better noise tolerance and/or fewer nonlinearities relative to traditional QAM, among other examples.

For example, as shown in FIG. 4, the Tx chain in the PAS system may include a demultiplexer 410 (shown as demux 410), a distribution matcher 420, an amplitudes-to-bits converter 430, a forward error correction (FEC) encoder 440, and a constellation mapping component 450. As shown, the demultiplexer 410 may receive a binary information string to be transmitted, and may provide an information string that includes k bits to the distribution matcher 420, where k is a uniform input bit length for the distribution matcher 420. As further shown, the distribution matcher 420 may map the binary information string to positive amplitudes with a non-uniform distribution to produce an output n, where n is a shaped output in one dimension based on an amplitude-shift keying (ASK) sequence length. For example, the distribution matcher 420 may map the binary information string to the positive amplitudes with the non-uniform distribution based on a DM rate (e.g., a shaping rate)

$$R_S = \frac{k}{n}$$

and/or a Maxwell-Boltzmann distribution parameter (v) that can be mapped to a DM rate.

As further shown, the output n from the distribution matcher 420 may be provided to the amplitude-to-bits converter 430, which may convert the shaped output based on the ASK sequence length into (m−1)n bits, where m is log-2 of $2^m$-ASK size (e.g., a number of bits per one dimension). The (m−1)n bits output from the amplitude-to-bits converter 430 may be provided to the FEC encoder 440 together with a γn-bit information string output by the demultiplexer 410, where γ is a rate of one or more extra (e.g., uniform) data bits carried over one or more symbol signs. As further shown, the FEC encoder 440 may generate (m−1)n shaped systematic bits based on the output from the amplitude-to-bits converter 430, and may generate γn non-shaped systematic bits and (1−γ)n parity check bits based on the γn-bit information string output by the demultiplexer 410. For example, as shown at 445, the FEC encoder 440 may generate the shaped systematic bits, the non-shaped systematic bits, and/or the parity check bits based on an FEC rate $R_c$=(m−1+γ)/m≥(m−1)/m. As further shown, the constellation mapping component 450 may use the shaped systematic bits to generate transmit amplitudes A, and may further use the non-shaped systematic bits and the parity check bits to generate transmit sign bits S associated with the transmit amplitudes.

As further shown, probabilistically shaped channel inputs X=A·S may then be transmitted over a wireless channel 460 that includes resources in a spatial domain (e.g., one or more layers), a frequency domain (e.g., one or more resource blocks (RBs) or frequency bands), and a time domain (e.g., one or more symbols or slots). For example, the probabilistically shaped channel inputs may be transmitted over the wireless channel 460 at a transmission rate $R_t$=$R_s$+γ<H(A)+γ, where H is the wireless channel 460.

In some aspects, the PAS system may include an Rx chain that can receive a signal transmitted over the wireless channel 460, and one or more components of the Rx chain may be implemented in the receive processor 258, the MIMO detector 256, the modem 254, and/or the controller/processor 280 described above in connection with FIG. 2. In some aspects, the Rx chain may be implemented in a UE 120 for receiving data from a base station 110 on a downlink channel and/or receiving data from another UE 120 on a sidelink channel using a PAS technique. As further shown, the Rx chain may include various components that perform an inverse function relative to the Tx chain. For example, the Rx chain may include a multiplexer 410' (shown as mux 410'), a distribution dematcher 420', a bits-to-amplitudes converter 430', an FEC decoder 440', and a constellation demapping component 450' that may convert probabilistically shaped channel inputs into a received binary string.

In this way, the PAS system may enable more granular control over a number of bits per symbol and improved spectral efficiency with better noise tolerance and/or fewer nonlinearities relative to traditional QAM by using inner constellation points associated with a lower energy and/or a lower power more frequently than outer constellation points associated with a higher energy and/or a higher power. For example, on the transmit side (e.g., in the Tx chain), rate adaptation may be performed by tuning the DM parameters (e.g., the DM rate and/or Maxwell-Boltzmann distribution parameter) and the non-shaped information bits (yn). For example, the output from the distribution matcher 420 is used to map the binary bits to be transmitted to positive amplitudes with a non-uniform distribution, and non-shaped information bits and parity bits are mapped to the sign(s) of the constellation, where uniformly distributed sign bits cause no change to the constellation distribution. However, one challenge that may arise in a PAS system is sensitivity to signal-to-noise ratio (SNR) variation, which can be significant when the wireless channel 460 is a spatial and frequency selective channel. For example, fading (e.g., varied signal attenuation) may occur in the wireless channel 460 in a spatial domain (e.g., at different locations or in different directions), a frequency domain (e.g., in different sub-bands), and/or a time domain (e.g., at different time instances) due to multipath propagation, weather, and/or shadowing from obstacles that affect wave propagation, among other examples. Accordingly, to combat fading, a wireless network may support techniques such as frequency-selective precoding, channel coding, and/or interleaving, which can result in SNR variation in the spatial domain, the frequency domain, and/or the time domain. The SNR variation may pose challenges in a PAS system, where the DM rate needs to be adapted based on different SNR conditions.

Some aspects described herein relate to techniques and apparatuses to configure a PAS system (e.g., indicate a DM rate) in a spatial and/or frequency selective wireless channel that may be associated with SNR variations. For example, in some aspects, an MCS configuration may include a wideband configuration and a sub-band configuration, where the wideband configuration may include a modulation order to apply to a wideband frequency and the sub-band configuration may include a differential or selective indication of one or more DM parameters for different sub-bands within the wideband frequency. In some aspects, the wideband configuration may further include a coding rate to apply to the wideband frequency, or the coding rate may be provided in a differential or selective indication per sub-band. In this way, the wideband parameters (e.g., modulation order) may be applicable over a wide range of SNRs, and the sub-band parameters (e.g., DM parameters) may be fine-tuned based on SNR variations that occur in different sub-bands. Furthermore, some aspects described herein relate to a codeword and resource mapping that may be used in a spatial and/or frequency selective wireless channel. For example, in some aspects, resources that are associated with the same DM parameters may be mapped to the same codeword, or resources that are associated with different DM parameters (e.g., the same modulation order and/or coding rate but different DM parameters) may be mapped to the same codeword. Further details are provided below, for example, in connection with FIGS. 5A-5E.

The number and arrangement of components shown in FIG. 4 are provided as an example. In practice, there may be additional components, fewer components, different components, or differently arranged components than those shown in FIG. 4. Furthermore, two or more components shown in FIG. 4 may be implemented within a single component, or a single component shown in FIG. 4 may be implemented as multiple, distributed components. Additionally, or alternatively, a set of components (e.g., one or more components) shown in FIG. 4 may perform one or more functions described as being performed by another set of components shown in FIG. 4.

FIGS. 5A-5E are diagrams illustrating examples 500 associated with configuring a PAS system on a spatial and frequency selective wireless channel. As shown in FIG. 5, examples 500 include communication between a base station (e.g., base station 110) and a UE (e.g., UE 120). In some aspects, the UE and the base station may communicate in a wireless network (e.g., wireless network 100) via a wireless access link, which may include an uplink and a downlink.

Figure 5A:
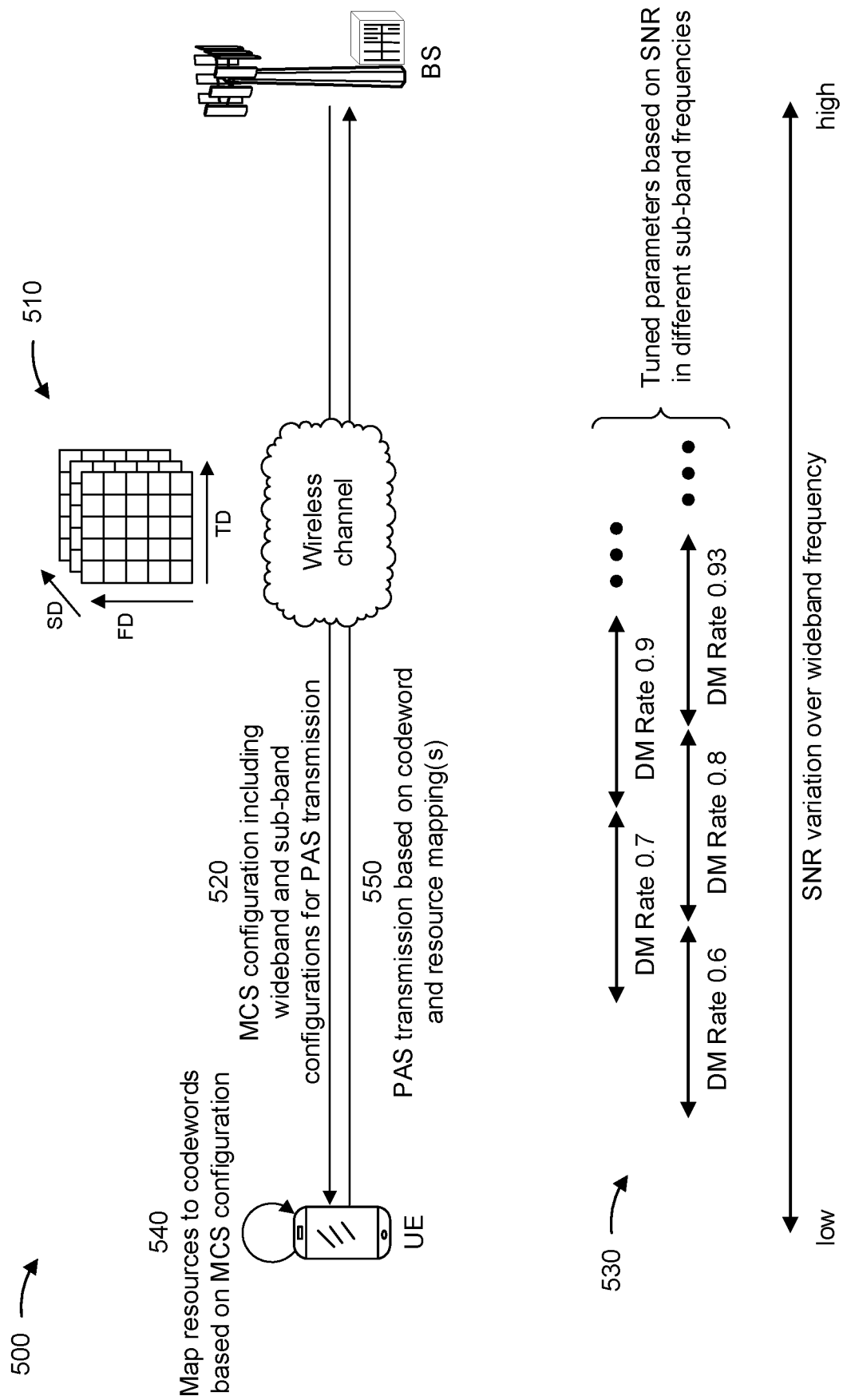

As shown in FIG. 5A, at 510, the UE and the base station may communicate over a wireless channel that includes one or more resources in a spatial domain (e.g., one or more layers), one or more resources in a frequency domain (e.g., one or more RBs, a wideband frequency, and/or one or more sub-band frequencies), and one or more resources in a time domain (e.g., one or more symbols or slots). In some aspects, as described herein, the wireless channel may be spatial and frequency selective due to SNR variation caused by techniques that are used to combat fading (e.g., varied signal attenuation) in the wireless channel. For example, in some aspects, the UE and the base station may communicate in a wireless network that supports techniques such as frequency-selective precoding, channel coding, and/or interleaving to combat fading, which can result in SNR variation in the spatial domain, the frequency domain, and/or the time domain. Accordingly, in some aspects, a PAS system implemented at the UE may include one or more components (e.g., in a Tx chain) that are configured with parameters adapted to the SNR variation.

For example, as shown in FIG. 5A, at 520, the base station may transmit, and the UE may receive, information indicating an MCS configuration that includes a wideband configuration and one or more sub-band configurations for a PAS transmission by the UE. For example, in some aspects, the MCS configuration may include an MCS index that is indicated in downlink control information (DCI) or other suitable signaling, and the MCS index may indicate one or more PAS transmission parameters associated with a wideband frequency and one or more PAS transmission parameters associated with one or more sub-band frequencies within the wideband frequency. For example, as shown at 530, the one or more parameters indicated in the wideband configuration may apply to a wideband frequency that covers a wide range of SNR values (e.g., from low to high), and the one or more parameters indicated in the sub-band configurations may be tuned to SNR conditions that occur in different sub-band frequencies within the wideband frequency. For example, as shown in FIG. 5B, at 532, the MCS configuration may include a wideband configuration that indicates a modulation order and a coding rate (m, c) applied to a wideband frequency, and the wideband configuration may be associated with one or more sub-band configurations that indicate respective DM parameters for one or more sub-band frequencies within the wideband frequency. For example, in FIG. 5B, a wideband frequency may include four different sub-band frequencies, and the wideband configuration may indicate a modulation order and coding rate for the wideband frequency and the sub-band configurations may indicate differential or selective DM parameters (e.g., a DM rate and/or a Maxwell-Boltzmann distribution parameter (v) that impacts the constellation distribution of the modulated symbols) for each respective sub-band frequency. Alternatively, as shown in FIG. 5B, at 534, the wideband configuration may indicate only the modulation order for the wideband frequency and the sub-band configurations may indicate a combination of a coding rate and a DM parameter for each respective sub-band frequency.

Furthermore, in some aspects, the MCS configuration may be used to indicate one or more differential or selective parameters in a spatial domain. For example, as described above, the MCS configuration may include a wideband configuration and one or more sub-band configurations in a frequency domain, where the MCS configuration indicates a modulation order for a wideband frequency, differential or selective DM parameters per sub-band within the wideband frequency, and coding rates that may be indicated for the wideband frequency and/or per sub-band frequency. In a similar respect, the PAS system implemented at the UE may support transmission via different layers in the spatial domain, whereby the MCS configuration may indicate a DM parameter to be used per spatial layer and/or a combination of a coding rate and a DM parameter to be used per spatial layer (e.g., to account for variations in SNR conditions associated with different spatial layers and/or different sub-band frequencies).

Accordingly, as described herein, the wideband configuration may include a modulation order and a coding rate associated with a wideband frequency, and the sub-band configurations may include DM parameters associated with different sub-bands and/or different layers. Alternatively, in some aspects, the wideband configuration may include only the modulation order associated with the wideband frequency, and the sub-band configurations may include a coding rate and a DM parameter associated with respective sub-bands and/or respective layers. Furthermore, in some aspects, the wideband configuration (e.g., a modulation order or a combination of a modulation order and a coding rate) may be common to different spatial layers or layer-specific.

For example, as shown in FIG. 5B, at 536, the UE may be configured to communicate over a wideband frequency that includes four sub-band frequencies (indexed from 0 to 3) using two spatial layers. In this example, the wideband configuration may be common to the different spatial layers, and the sub-band configurations may indicate separate parameters per sub-band and per layer. For example, in FIG. 5B, the wideband configuration includes a modulation order and a coding rate that applies to all sub-band frequencies and all spatial layers, and the sub-band configuration includes selective DM parameters for sub-band frequencies in a first spatial layer (shown as $SB_{L1}$) and selective DM parameters for sub-band frequencies in a second spatial layer (shown as $SB_{L2}$). Alternatively, as shown at 538, the MCS configuration may be associated with a layer-specific wideband parameter and layer-specific sub-band parameters. For example, a first spatial layer may be associated with a first wideband configuration (shown as $WB_{L1}$) and a first set of sub-band configurations (shown as $SB_{L1}$), and a second spatial layer may be associated with a second wideband configuration (shown as $WB_{L2}$) and a second set of sub-band configurations (shown as $SB_{L2}$).

Figure 5C:
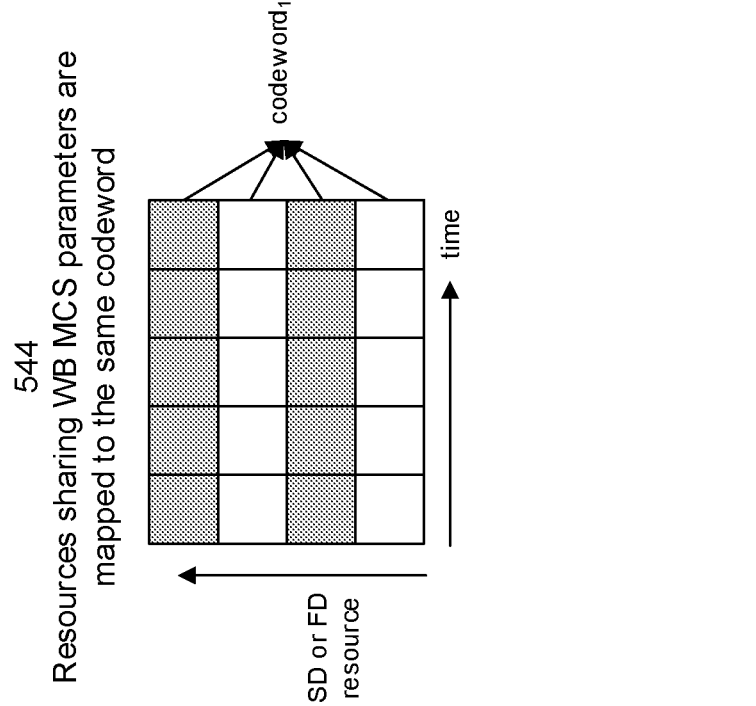
Figure 5C:
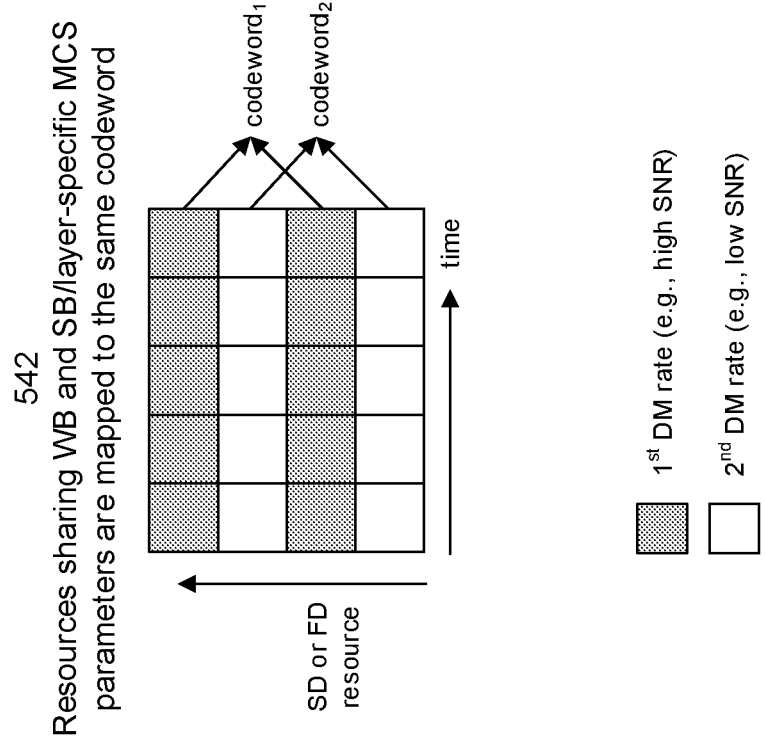

As further shown in FIG. 5A, at 540, the UE may map one or more resources in the spatial domain, the frequency domain, and/or the time domain to one or more codewords based on the MCS configuration. For example, as shown in FIG. 5C, at 542, the UE may map resources that share the same wideband and sub-band-specific and/or layer-specific MCS parameters to the same codeword. In the illustrated example, a resource grid includes spatial, frequency, and/or time resources that are mapped to one or more codewords, and each resource is associated with an MCS configuration that includes a combination of a modulation order, a coding rate, and a DM parameter. Accordingly, any resources that have common wideband and sub-band or layer-specific parameters (e.g., the same modulation order, coding rate, and DM parameter) may be mapped to the same codeword, while resources that have different wideband and sub-band or layer-specific parameters (e.g., different modulation orders, coding rates, and/or DM parameters) may be mapped to different codewords. For example, in the example shown at 542, all blocks in the grid may share the same wideband parameters (e.g., the same modulation order and coding rate), the shaded blocks may correspond to resources in the spatial domain and/or the frequency domain that are associated with a first DM rate (e.g., spatial layers, RBs, and/or sub-bands with a high SNR), and the unshaded blocks may correspond to resources in the spatial domain and/or the frequency domain that are associated with a second DM rate (e.g., spatial layers, RBs, and/or sub-bands with a low SNR). In this case, the first and third rows correspond to spatial layers, RBs, and/or sub-bands that have a first combination of a modulation order, a coding rate, and a DM parameter, and are therefore mapped to a first codeword, and the second and fourth rows correspond to spatial layers, RBs, and/or sub-bands that have a second combination of a modulation order, a coding rate, and a DM parameter, and are therefore mapped to a second codeword that is separate from the first codeword. Alternatively, as shown at 544, resources that are associated with the same modulation order and coding rate may be mapped to the same codeword. In this case, resources that are associated with different DM parameters may be mapped to the same codeword if such resources have the same modulation order and coding rate, and resources that are associated with different modulation orders and/or different coding rates may be mapped to separate codewords.

Figure 5D:
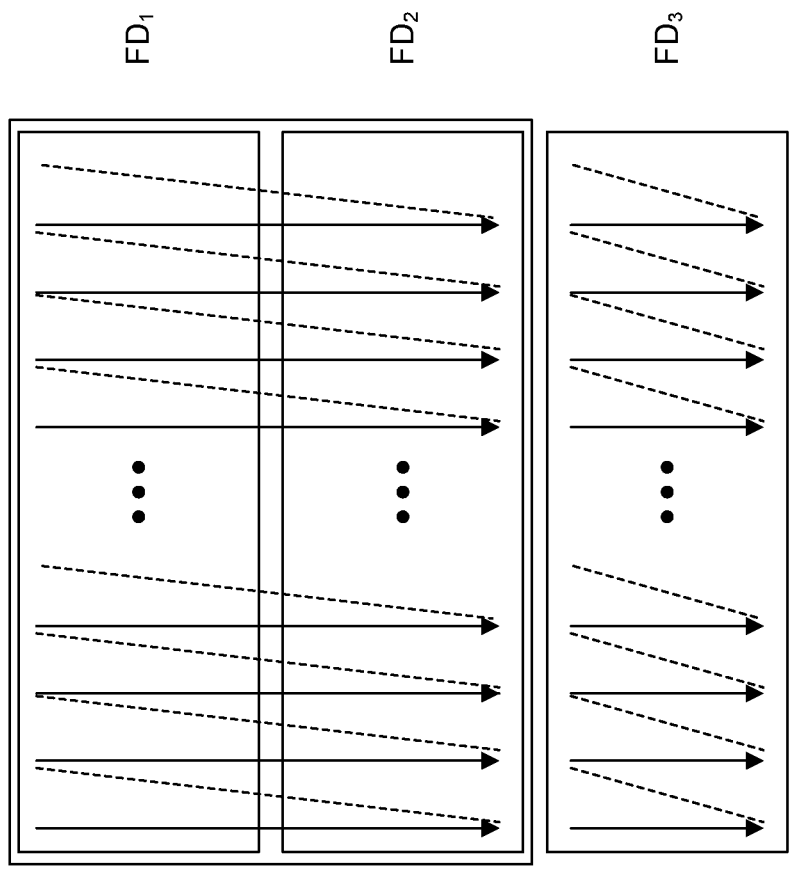

Furthermore, in addition to mapping resources to codewords based on whether different resources have the same or different modulation orders, coding rates, and/or DM parameters, the UE may determine an order in which to map codeword bits to the resources. For example, as shown in FIG. 5D at 546, given a codeword associated with the same DM parameter(s), the corresponding resources may be mapped in order of a spatial domain, followed by a frequency domain, followed by a time domain. In the illustrated example, a codeword may be mapped to a first set of resources in a frequency domain (shown as $FD_1$), a second set of resources in the frequency domain (shown as $FD_2$), and a third set of resources in the frequency domain (shown as $FD_3$), and the wideband configuration associated with the codeword may include a modulation order and a coding rate applied across the first, second, and third set of frequency domain resources. Furthermore, as shown, each set of frequency domain resources may be associated with a separate DM parameter, where the value of the DM parameter is the same for the first set of frequency domain resources and the second set of frequency domain resources and different for the third set of frequency domain resources. Accordingly, for a given codeword associated with DM parameters that are indicated in the spatial and/or frequency domain, resources with the same DM parameters are mapped in order of the spatial domain, the frequency domain, and the time domain, and resources with different DM parameters are mapped separately according to the differential or selective MCS configuration in the spatial domain and/or the frequency domain. Furthermore, in some aspects, the UE may be configured to interleave data only for resources in the spatial domain or the frequency domain that share the same DM parameters. For example, in FIG. 5D, data interleaving may be performed across the first set of frequency domain resources and the second set of frequency domain resources that share the same DM parameters (indicated by arrows and dashed lines spanning the first set of frequency domain resources and the second set of frequency domain resources), and data interleaving is not performed in the third set of frequency domain resources with different DM parameters from the first and second sets of frequency domain resources.

In some aspects, as described herein, a Tx chain used in a PAS system may include a DM component prior to one or more codeblock generation components (e.g., an FEC encoder and/or constellation mapping component). Accordingly, the UE may determine a relationship between a concatenation of DM blocks and codeblocks (or codewords) to apply in a spatial or frequency selective wireless channel. For example, in some aspects, the UE may include a DM component configured to generate multiple DM blocks based on the DM parameter(s) that are configured for different spatial layers and/or frequency sub-bands, identify DM blocks that have the same coding rate, and concatenate only DM blocks that have the same coding rate (e.g., to simplify the processing chain). Alternatively, in some aspects, the DM component may identify DM blocks that have different coding rates, and may concatenate DM blocks that have the same modulation order and DM parameter(s) (e.g., to reduce a DM rate loss that may occur with a larger data length). For example, as shown in FIG. 5E, at 548, an example is illustrated where the UE concatenates DM blocks with the same modulation order and DM parameter(s). For example, as shown, an MCS configuration may include a layer-specific wideband configuration that indicates a first modulation order and coding rate for a spatial layer having a first index and a second modulation order and coding rate for a spatial layer having a second index, with the same modulation order used in the first and second spatial layers. Furthermore, as shown, the UE may be configured with four frequency sub-bands across the two spatial layers, where the MCS configuration includes various sub-band configurations to indicate respective DM parameters for each frequency sub-band across the two spatial layers. In this case, the same DM blocks are used for spatial layers and frequency sub-bands with the same modulation order and the same DM parameters, and different DM blocks are used for spatial layers and/or frequency sub-bands with different modulation orders and/or different DM parameters.

Accordingly, as shown in FIG. 5A, at 550, the UE may perform a PAS transmission over the wireless channel using one or more resources in the spatial domain, the frequency domain, and/or the time domain based on the MCS configuration. For example, as described above, the UE may determine a modulation order, coding rate, and DM parameters (e.g., DM rate and/or a Maxwell-Boltzmann distribution parameter) to apply for a wideband frequency, one or more sub-band frequencies, and/or one or more spatial layers based on one or more wideband configurations and/or one or more sub-band or layer-specific configurations included in the MCS configuration. In some aspects, the DM parameters may be used to adapt the DM rate that the DM component of the UE uses to map a binary information string to amplitudes that have a non-uniform (e.g., Gaussian) distribution. Furthermore, in some aspects, the DM component may generate one or more DM blocks based on spatial and/or frequency resources that have the same coding rate and/or the same modulation order and DM parameter(s), and one or more of an amplitudes-to-bits converter, an FEC encoder, or a constellation mapping component may perform a resource to codeword mapping to generate one or more codewords based on the output from the DM component. In this way, MCS parameters (e.g., a modulation order, coding rate, and DM parameters) may be tuned based on variations in SNR that may occur in different spatial resources and/or different frequency resources, which may enable the UE to transmit codeword constellations more efficiently and/or reliably.

As indicated above, FIGS. 5A-5E are provided as examples. Other examples may differ from what is described with regard to FIGS. 5A-5E. For example, although examples 500 are described in connection with a UE configuring a PAS system that is used to transmit data to a base station over an access link, the same or similar techniques may be used to configure the UE to transmit data to another UE over a sidelink (e.g., based on a sidelink MCS indicated in sidelink control information).

Figure 6:
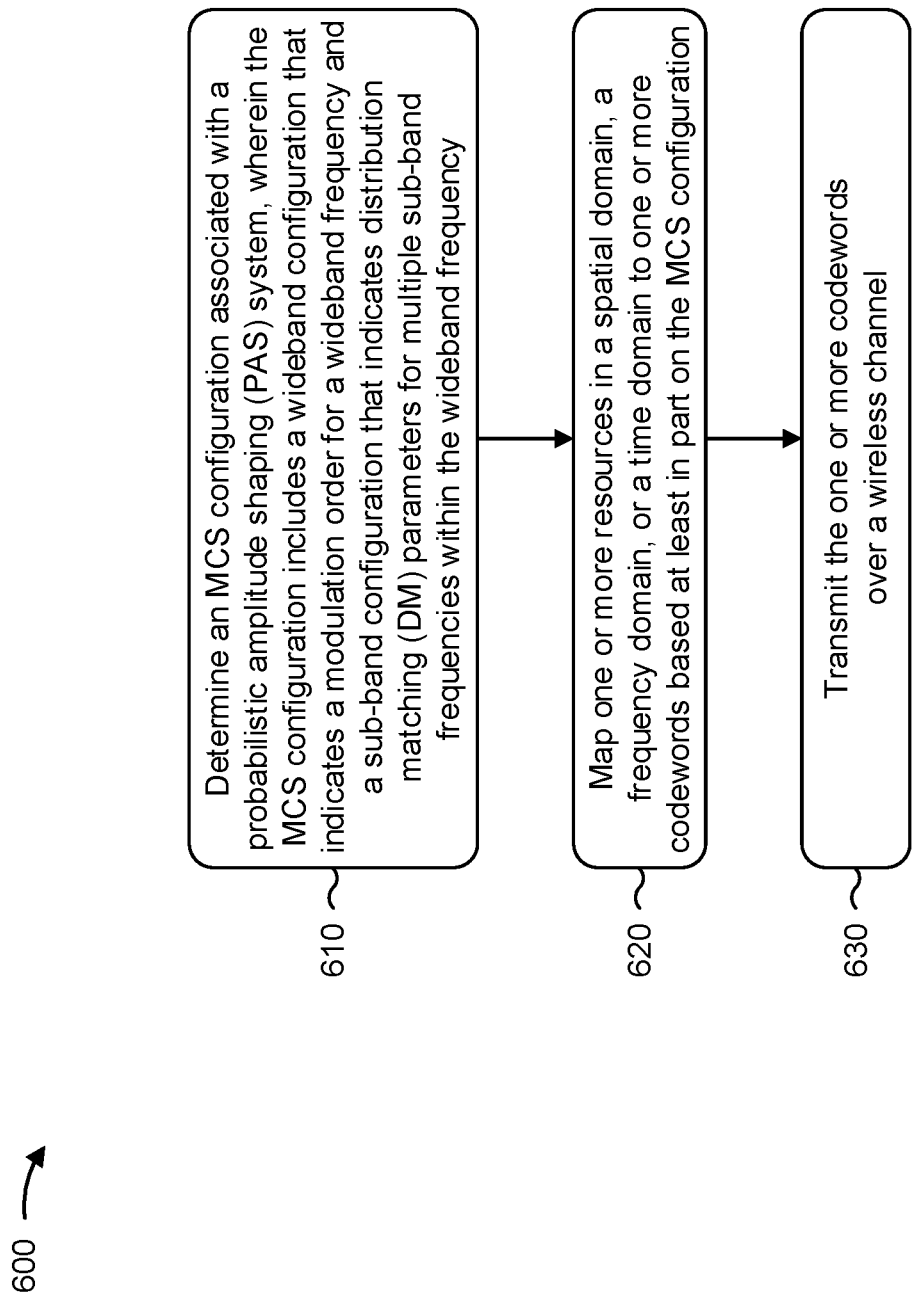
FIG. 6 is a flowchart of an example method of wireless communication.

FIG. 6 is a flowchart of an example method 600 of wireless communication. The method 600 may be performed by, for example, a UE (e.g., UE 120).

At 610, the UE may determine an MCS configuration associated with a PAS system, wherein the MCS configuration includes a wideband configuration that indicates a modulation order for a wideband frequency and a sub-band configuration that indicates DM parameters for multiple sub-band frequencies within the wideband frequency. For example, the UE (e.g., using communication manager 140 and/or determination component 708, depicted in FIG. 7) may determine an MCS configuration associated with a PAS system, wherein the MCS configuration includes a wideband configuration that indicates a modulation order for a wideband frequency and a sub-band configuration that indicates DM parameters for multiple sub-band frequencies within the wideband frequency, as described above in connection with, for example, FIGS. 5A-5B at 520, 530, 532, 534, 536, and 538. In some aspects, the wideband configuration further indicates a coding rate for the wideband frequency. In some aspects, the sub-band configuration further indicates coding rates for the multiple sub-band frequencies within the wideband frequency. In some aspects, the MCS configuration further includes a layer configuration that indicates DM parameters for multiple layers in the spatial domain. In some aspects, the wideband configuration is associated with multiple layers in the spatial domain. In some aspects, the wideband configuration includes a first wideband configuration associated with a first layer in the spatial domain and a second wideband configuration associated with a second layer in the spatial domain. In some aspects, the DM parameters include one or more of a DM rate or a Maxwell-Boltzmann distribution parameter.

At 620, the UE may map one or more resources in a spatial domain, a frequency domain, or a time domain to one or more codewords based at least in part on the MCS configuration. For example, the UE (e.g., using communication manager 140 and/or mapping component 710, depicted in FIG. 7) may map one or more resources in a spatial domain, a frequency domain, or a time domain to one or more codewords based at least in part on the MCS configuration, as described above in connection with, for example, FIG. 5A at 540 and FIGS. 5C-5E at 542, 544, 546, and 548. In some aspects, mapping the one or more resources to the one or more codewords includes mapping a first set of resources and a second set of resources to a common codeword based at least in part on the first set of resources and the second set of resources sharing a same DM parameter. In some aspects, mapping the one or more resources to the one or more codewords includes mapping a first set of resources to a first codeword and a second set of resources to a second codeword based at least in part on the first set of resources and the second set of resources having different DM parameters. In some aspects, mapping the one or more resources to the one or more codewords includes mapping a first set of resources and a second set of resources to a common codeword based at least in part on the first set of resources and the second set of resources sharing a same modulation order and a same coding rate. In some aspects, mapping the one or more resources to the one or more codewords includes mapping a first set of resources to a first codeword and a second set of resources to a second codeword based at least in part on the first set of resources and the second set of resources having different modulation orders or different coding rates.

In some aspects, method 600 includes mapping codeword bits associated with a same DM parameter to the one or more resources in an order of the spatial domain, followed by the frequency domain, followed by the time domain. In some aspects, the codeword bits associated with the same DM parameter are interleaved over the one or more resources in the spatial domain, the frequency domain, and the time domain that share the same DM parameters. In some aspects, method 600 includes mapping codeword bits associated with different DM parameters to the one or more resources separately according to the MCS configuration.

In some aspects, method 600 includes generating multiple DM blocks based at least in part on the wideband configuration and the sub-band configuration included in the MCS configuration, identifying, among the multiple DM blocks, at least a first DM block and a second DM block that share a coding rate, and concatenating at least the first DM block and the second DM block in the one or more codewords that are mapped to the one or more resources in the spatial domain, the frequency domain, or the time domain. In some aspects, method 600 includes generating multiple DM blocks based at least in part on the wideband configuration and the sub-band configuration included in the MCS configuration, identifying, among the multiple DM blocks, at least a first DM block and a second DM block that share a modulation order and a DM parameter, and concatenating at least the first DM block and the second DM block in the one or more codewords that are mapped to the one or more resources in the spatial domain, the frequency domain, or the time domain.

At 630, the UE may transmit the one or more codewords over a wireless channel. For example, the UE (e.g., using communication manager 140 and/or transmission component 704, depicted in FIG. 7) may transmit the one or more codewords over a wireless channel, as described above in connection with, for example, FIG. 5A at 550.

Although FIG. 6 shows example blocks of method 600, in some aspects, method 600 may include additional blocks, fewer blocks, different blocks, or differently arranged blocks than those depicted in FIG. 6. Additionally, or alternatively, two or more of the blocks of method 600 may be performed in parallel.

Figure 7:
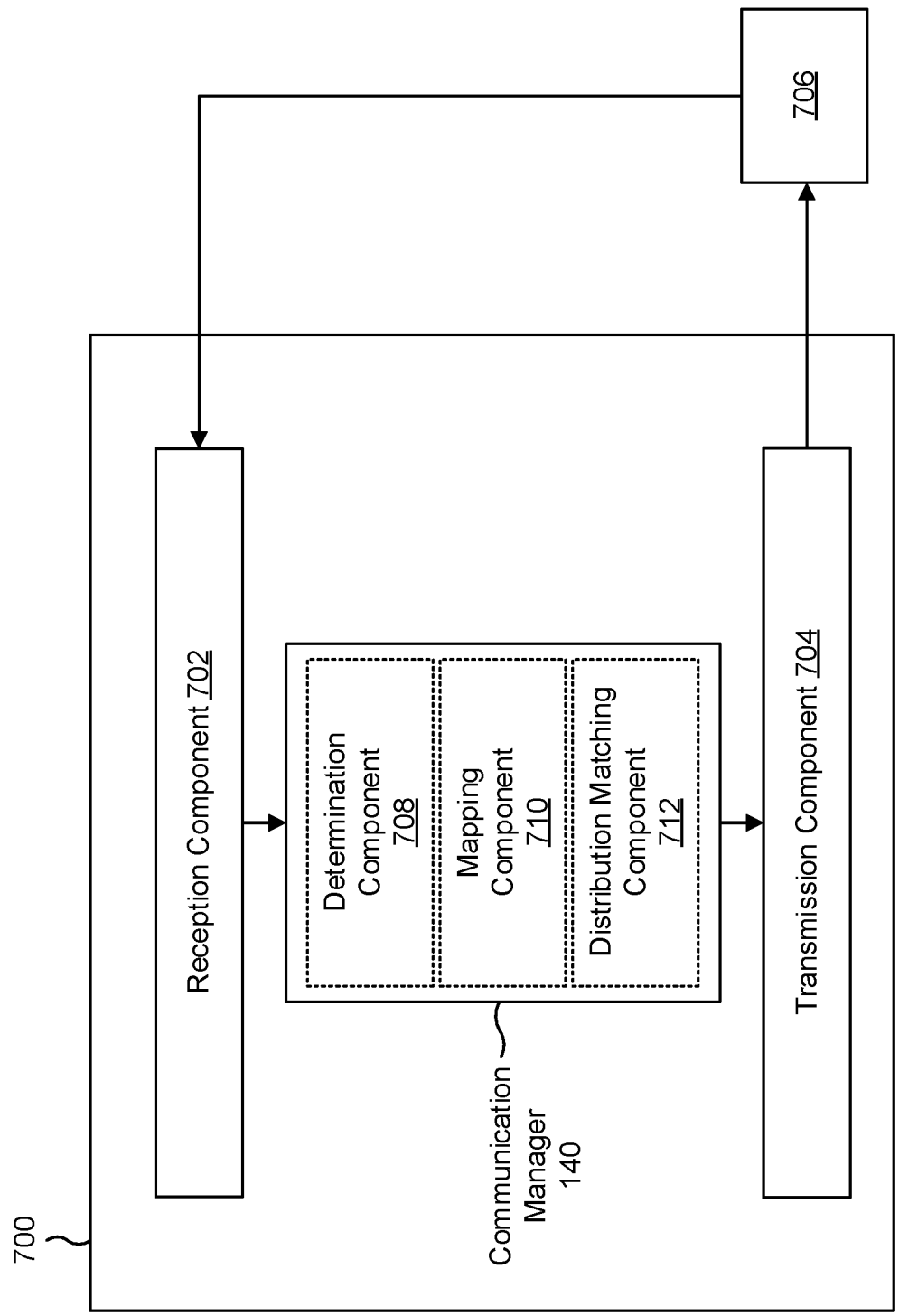
FIG. 7 is a diagram of an example apparatus for wireless communication.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a determination component 708, a mapping component 710, or a DM component 712, among other examples.

In some aspects, the apparatus 700 may be configured to perform one or more operations described herein in connection with FIGS. 5A-5E. Additionally, or alternatively, the apparatus 700 may be configured to perform one or more methods described herein, such as method 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The determination component 708 may determine an MCS configuration associated with a PAS system, wherein the MCS configuration includes a wideband configuration that indicates a modulation order for a wideband frequency and a sub-band configuration that indicates DM parameters for multiple sub-band frequencies within the wideband frequency. The mapping component 710 may map one or more resources in a spatial domain, a frequency domain, or a time domain to one or more codewords based at least in part on the MCS configuration. The transmission component 704 may transmit the one or more codewords over a wireless channel.

The mapping component 710 may map a first set of resources and a second set of resources to a common codeword based at least in part on the first set of resources and the second set of resources sharing a same DM parameter.

The mapping component 710 may map a first set of resources to a first codeword and a second set of resources to a second codeword based at least in part on the first set of resources and the second set of resources having different DM parameters.

The mapping component 710 may map a first set of resources and a second set of resources to a common codeword based at least in part on the first set of resources and the second set of resources sharing a same modulation order and a same coding rate.

The mapping component 710 may map a first set of resources to a first codeword and a second set of resources to a second codeword based at least in part on the first set of resources and the second set of resources having different modulation orders or different coding rates.

The mapping component 710 may map codeword bits associated with a same DM parameter to the one or more resources in an order of the spatial domain, followed by the frequency domain, followed by the time domain.

The mapping component 710 may map codeword bits associated with different DM parameters to the one or more resources separately according to the MCS configuration.

The DM component 712 may generate multiple DM blocks based at least in part on the wideband configuration and the sub-band configuration included in the MCS configuration. The DM component 712 may identify, among the multiple DM blocks, at least a first DM block and a second DM block that share a coding rate. The DM component 712 may concatenate at least the first DM block and the second DM block in the one or more codewords that are mapped to the one or more resources in the spatial domain, the frequency domain, or the time domain.

The DM component 712 may generate multiple DM blocks based at least in part on the wideband configuration and the sub-band configuration included in the MCS configuration. The DM component 712 may identify, among the multiple DM blocks, at least a first DM block and a second DM block that share a modulation order and a DM parameter. The DM component 712 may concatenate at least the first DM block and the second DM block in the one or more codewords that are mapped to the one or more resources in the spatial domain, the frequency domain, or the time domain.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
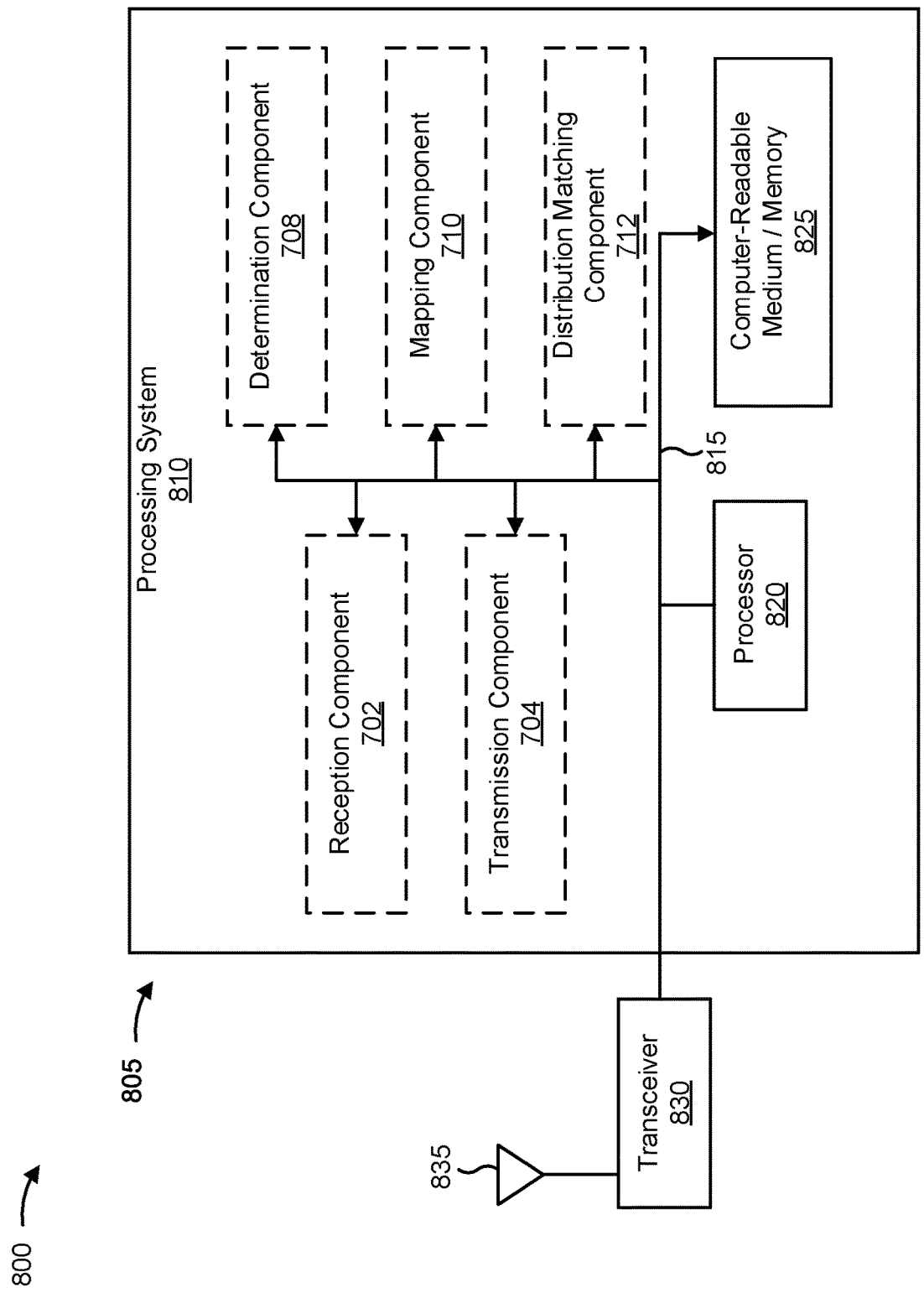
FIG. 8 is a diagram illustrating an example of a hardware implementation for an apparatus employing a processing system.

FIG. 8 is a diagram illustrating an example 800 of a hardware implementation for an apparatus 805 employing a processing system 810. The apparatus 805 may be a UE.

The processing system 810 may be implemented with a bus architecture, represented generally by the bus 815. The bus 815 may include any number of interconnecting buses and bridges depending on the specific application of the processing system 810 and the overall design constraints. The bus 815 links together various circuits including one or more processors and/or hardware components, represented by the processor 820, the illustrated components, and the computer-readable medium/memory 825. The bus 815 may also link various other circuits, such as timing sources, peripherals, voltage regulators, and/or power management circuits.

The processing system 810 may be coupled to a transceiver 830. The transceiver 830 is coupled to one or more antennas 835. The transceiver 830 provides a means for communicating with various other apparatuses over a transmission medium. The transceiver 830 receives a signal from the one or more antennas 835, extracts information from the received signal, and provides the extracted information to the processing system 810, specifically the reception component 702. In addition, the transceiver 830 receives information from the processing system 810, specifically the transmission component 704, and generates a signal to be applied to the one or more antennas 835 based at least in part on the received information.

The processing system 810 includes a processor 820 coupled to a computer-readable medium/memory 825. The processor 820 is responsible for general processing, including the execution of software stored on the computer-readable medium/memory 825. The software, when executed by the processor 820, causes the processing system 810 to perform the various functions described herein for any particular apparatus. The computer-readable medium/memory 825 may also be used for storing data that is manipulated by the processor 820 when executing software. The processing system further includes at least one of the illustrated components. The components may be software modules running in the processor 820, resident/stored in the computer readable medium/memory 825, one or more hardware modules coupled to the processor 820, or some combination thereof.

In some aspects, the processing system 810 may be a component of the UE 120 and may include the memory 282 and/or at least one of the TX MIMO processor 266, the RX processor 258, and/or the controller/processor 280. In some aspects, the apparatus 805 for wireless communication includes means for determining an MCS configuration associated with a PAS system, wherein the MCS configuration includes a wideband configuration that indicates a modulation order for a wideband frequency and a sub-band configuration that indicates DM parameters for multiple sub-band frequencies within the wideband frequency, means for mapping one or more resources in a spatial domain, a frequency domain, or a time domain to one or more codewords based at least in part on the MCS configuration, and means for transmitting the one or more codewords over a wireless channel. The aforementioned means may be one or more of the aforementioned components of the apparatus 700 and/or the processing system 810 of the apparatus 805 configured to perform the functions recited by the aforementioned means. As described elsewhere herein, the processing system 810 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 8 is provided as an example. Other examples may differ from what is described in connection with FIG. 8.

The following provides an overview of some Aspects of the present disclosure:

Aspect 1: A method of wireless communication performed by a UE, comprising: determining an MCS configuration associated with a PAS system, wherein the MCS configuration includes a wideband configuration that indicates a modulation order for a wideband frequency and a sub-band configuration that indicates DM parameters for multiple sub-band frequencies within the wideband frequency; mapping one or more resources in a spatial domain, a frequency domain, or a time domain to one or more codewords based at least in part on the MCS configuration; and transmitting the one or more codewords over a wireless channel.

Aspect 2: The method of Aspect 1, wherein the wideband configuration further indicates a coding rate for the wideband frequency.

Aspect 3: The method of Aspect 1, wherein the sub-band configuration further indicates coding rates for the multiple sub-band frequencies within the wideband frequency.

Aspect 4: The method of any of Aspects 1-3, wherein the MCS configuration further includes a layer configuration that indicates DM parameters for multiple layers in the spatial domain.

Aspect 5: The method of any of Aspects 1-4, wherein the wideband configuration is associated with multiple layers in the spatial domain.

Aspect 6: The method of any of Aspects 1-5, wherein the wideband configuration includes a first wideband configuration associated with a first layer in the spatial domain and a second wideband configuration associated with a second layer in the spatial domain.

Aspect 7: The method of any of Aspects 1-6, wherein mapping the one or more resources to the one or more codewords includes: mapping a first set of resources and a second set of resources to a common codeword based at least in part on the first set of resources and the second set of resources sharing a same DM parameter.

Aspect 8: The method of any of Aspects 1-6, wherein mapping the one or more resources to the one or more codewords includes: mapping a first set of resources to a first codeword and a second set of resources to a second codeword based at least in part on the first set of resources and the second set of resources having different DM parameters.

Aspect 9: The method of any of Aspects 1-6, wherein mapping the one or more resources to the one or more codewords includes: mapping a first set of resources and a second set of resources to a common codeword based at least in part on the first set of resources and the second set of resources sharing a same modulation order and a same coding rate.

Aspect 10: The method of any of Aspects 1-6, wherein mapping the one or more resources to the one or more codewords includes: mapping a first set of resources to a first codeword and a second set of resources to a second codeword based at least in part on the first set of resources and the second set of resources having different modulation orders or different coding rates.

Aspect 11: The method of any of Aspects 1-10, further comprising: mapping codeword bits associated with a same DM parameter to the one or more resources in an order of the spatial domain, followed by the frequency domain, followed by the time domain.

Aspect 12: The method of Aspect 11, wherein the codeword bits associated with the same DM parameter are interleaved over the one or more resources in the spatial domain, the frequency domain, and the time domain that share the same DM parameters.

Aspect 13: The method of any of Aspects 1-10, further comprising: mapping codeword bits associated with different DM parameters to the one or more resources separately according to the MCS configuration.

Aspect 14: The method of any of Aspects 1-13, further comprising: generating multiple DM blocks based at least in part on the wideband configuration and the sub-band configuration included in the MCS configuration; identifying, among the multiple DM blocks, at least a first DM block and a second DM block that share a coding rate; and concatenating at least the first DM block and the second DM block in the one or more codewords that are mapped to the one or more resources in the spatial domain, the frequency domain, or the time domain.

Aspect 15: The method of any of Aspects 1-13, further comprising: generating multiple DM blocks based at least in part on the wideband configuration and the sub-band configuration included in the MCS configuration; identifying, among the multiple DM blocks, at least a first DM block and a second DM block that share a modulation order and a DM parameter; and concatenating at least the first DM block and the second DM block in the one or more codewords that are mapped to the one or more resources in the spatial domain, the frequency domain, or the time domain.

Aspect 16: The method of any of Aspects 1-15, wherein the DM parameters include one or more of a DM rate or a Maxwell-Boltzmann distribution parameter.

Aspect 17: An apparatus for wireless communication at a device, comprising a processor; memory coupled with the processor; and instructions stored in the memory and executable by the processor to cause the apparatus to perform the method of one or more of Aspects 1-16.

Aspect 18: A device for wireless communication, comprising a memory and one or more processors coupled to the memory, the one or more processors configured to perform the method of one or more of Aspects 1-16.

Aspect 19: An apparatus for wireless communication, comprising at least one means for performing the method of one or more of Aspects 1-16.

Aspect 20: A non-transitory computer-readable medium storing code for wireless communication, the code comprising instructions executable by a processor to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      determine a modulation and coding scheme (MCS) configuration associated with a probabilistic amplitude shaping (PAS) system, wherein the MCS configuration includes a wideband configuration that indicates a modulation order for a wideband frequency and a sub-band configuration that indicates distribution matching (DM) parameters for multiple sub-band frequencies within the wideband frequency;
      map one or more resources in a spatial domain, a frequency domain, or a time domain to one or more codewords based at least in part on the MCS configuration; and
      transmit the one or more codewords over a wireless channel.

2. The UE of claim 1, wherein the wideband configuration further indicates a coding rate for the wideband frequency.

3. The UE of claim 1, wherein the sub-band configuration further indicates coding rates for the multiple sub-band frequencies within the wideband frequency.

4. The UE of claim 1, wherein the MCS configuration further includes a layer configuration that indicates DM parameters for multiple layers in the spatial domain.

5. The UE of claim 1, wherein the wideband configuration is associated with multiple layers in the spatial domain.

6. The UE of claim 1, wherein the wideband configuration includes a first wideband configuration associated with a first layer in the spatial domain and a second wideband configuration associated with a second layer in the spatial domain.

7. The UE of claim 1, wherein the one or more processors, to map the one or more resources to the one or more codewords, are configured to:
   map a first set of resources and a second set of resources to a common codeword based at least in part on the first set of resources and the second set of resources sharing a same DM parameter.

8. The UE of claim 1, wherein the one or more processors, to map the one or more resources to the one or more codewords, are configured to:
   map a first set of resources to a first codeword and a second set of resources to a second codeword based at least in part on the first set of resources and the second set of resources having different DM parameters.

9. The UE of claim 1, wherein the one or more processors, to map the one or more resources to the one or more codewords, are configured to:
   map a first set of resources and a second set of resources to a common codeword based at least in part on the first set of resources and the second set of resources sharing a same modulation order and a same coding rate.

10. The UE of claim 1, wherein the one or more processors, to map the one or more resources to the one or more codewords, are configured to:
    map a first set of resources to a first codeword and a second set of resources to a second codeword based at least in part on the first set of resources and the second set of resources having different modulation orders or different coding rates.

11. The UE of claim 1, wherein the one or more processors, to map the one or more resources to the one or more codewords, are configured to:
    map codeword bits associated with a same DM parameter to the one or more resources in an order of the spatial domain, followed by the frequency domain, followed by the time domain.

12. The UE of claim 11, wherein the codeword bits associated with the same DM parameter are interleaved over the one or more resources in the spatial domain, the frequency domain, and the time domain that share the same DM parameters.

13. The UE of claim 1, wherein the one or more processors are further configured to:
map codeword bits associated with different DM parameters to the one or more resources separately according to the MCS configuration.

14. The UE of claim 1, wherein the one or more processors are further configured to:
generate multiple DM blocks based at least in part on the wideband configuration and the sub-band configuration included in the MCS configuration;
identify, among the multiple DM blocks, at least a first DM block and a second DM block that share a coding rate; and
concatenate at least the first DM block and the second DM block in the one or more codewords that are mapped to the one or more resources in the spatial domain, the frequency domain, or the time domain.

15. The UE of claim 1, wherein the one or more processors are further configured to:
generate multiple DM blocks based at least in part on the wideband configuration and the sub-band configuration included in the MCS configuration;
identify, among the multiple DM blocks, at least a first DM block and a second DM block that share a modulation order and a DM parameter; and
concatenate at least the first DM block and the second DM block in the one or more codewords that are mapped to the one or more resources in the spatial domain, the frequency domain, or the time domain.

16. The UE of claim 1, wherein the DM parameters include one or more of a DM rate or a Maxwell-Boltzmann distribution parameter.

17. A method of wireless communication performed by a user equipment (UE), comprising:
determining a modulation and coding scheme (MCS) configuration associated with a probabilistic amplitude shaping (PAS) system, wherein the MCS configuration includes a wideband configuration that indicates a modulation order for a wideband frequency and a sub-band configuration that indicates distribution matching (DM) parameters for multiple sub-band frequencies within the wideband frequency;
mapping one or more resources in a spatial domain, a frequency domain, or a time domain to one or more codewords based at least in part on the MCS configuration; and
transmitting the one or more codewords over a wireless channel.

18. The method of claim 17, wherein the MCS configuration further includes a layer configuration that indicates DM parameters for multiple layers in the spatial domain.

19. The method of claim 17, wherein the wideband configuration is associated with multiple layers in the spatial domain.

20. The method of claim 17, wherein the wideband configuration includes a first wideband configuration associated with a first layer in the spatial domain and a second wideband configuration associated with a second layer in the spatial domain.

21. The method of claim 17, wherein mapping the one or more resources to the one or more codewords includes:
mapping a first set of resources and a second set of resources to a common codeword based at least in part on the first set of resources and the second set of resources sharing a same DM parameter.

22. The method of claim 17, wherein mapping the one or more resources to the one or more codewords includes:
mapping a first set of resources to a first codeword and a second set of resources to a second codeword based at least in part on the first set of resources and the second set of resources having different DM parameters.

23. The method of claim 17, wherein mapping the one or more resources to the one or more codewords includes:
mapping a first set of resources and a second set of resources to a common codeword based at least in part on the first set of resources and the second set of resources sharing a same modulation order and a same coding rate.

24. The method of claim 17, wherein mapping the one or more resources to the one or more codewords includes:
mapping a first set of resources to a first codeword and a second set of resources to a second codeword based at least in part on the first set of resources and the second set of resources having different modulation orders or different coding rates.

25. The method of claim 17, further comprising:
mapping codeword bits associated with a same DM parameter to the one or more resources in an order of the spatial domain, followed by the frequency domain, followed by the time domain.

26. The method of claim 17, further comprising:
mapping codeword bits associated with different DM parameters to the one or more resources separately according to the MCS configuration.

27. The method of claim 17, further comprising:
generating multiple DM blocks based at least in part on the wideband configuration and the sub-band configuration included in the MCS configuration;
identifying, among the multiple DM blocks, at least a first DM block and a second DM block that share a coding rate; and
concatenating at least the first DM block and the second DM block in the one or more codewords that are mapped to the one or more resources in the spatial domain, the frequency domain, or the time domain.

28. The method of claim 17, further comprising:
generating multiple DM blocks based at least in part on the wideband configuration and the sub-band configuration included in the MCS configuration;
identifying, among the multiple DM blocks, at least a first DM block and a second DM block that share a modulation order and a DM parameter; and
concatenating at least the first DM block and the second DM block in the one or more codewords that are mapped to the one or more resources in the spatial domain, the frequency domain, or the time domain.

29. An apparatus for wireless communication, comprising:
means for determining a modulation and coding scheme (MCS) configuration associated with a probabilistic amplitude shaping (PAS) system, wherein the MCS configuration includes a wideband configuration that indicates a modulation order for a wideband frequency and a sub-band configuration that indicates distribution matching (DM) parameters for multiple sub-band frequencies within the wideband frequency;
means for mapping one or more resources in a spatial domain, a frequency domain, or a time domain to one or more codewords based at least in part on the MCS configuration; and means for transmitting the one or more codewords over a wireless channel.

30. A non-transitory computer-readable medium storing a set of instructions for wireless communication, the set of instructions comprising:
one or more instructions that, when executed by one or more processors of a user equipment (UE), cause the UE to:
determine a modulation and coding scheme (MCS) configuration associated with a probabilistic amplitude shaping (PAS) system, wherein the MCS configuration includes a wideband configuration that indicates a modulation order for a wideband frequency and a sub-band configuration that indicates distribution matching (DM) parameters for multiple sub-band frequencies within the wideband frequency;
map one or more resources in a spatial domain, a frequency domain, or a time domain to one or more codewords based at least in part on the MCS configuration; and
transmit the one or more codewords over a wireless channel.

* * * * *